(12) United States Patent
Morgan et al.

(10) Patent No.: US 11,880,479 B2
(45) Date of Patent: *Jan. 23, 2024

(54) ACCESS CONTROL FOR UPDATING DOCUMENTS IN A DIGITAL DOCUMENT REPOSITORY

(71) Applicant: Bank of America Corporation, Charlotte, NC (US)

(72) Inventors: Beverley Claire Morgan, Wrexham (GB); Amanda Jane Adams, Flint (GB)

(73) Assignee: Bank of America Corporation, Charlotte, NC (US)

( * ) Notice: Subject to any disclaimer, the term of this patent is extended or adjusted under 35 U.S.C. 154(b) by 356 days.

This patent is subject to a terminal disclaimer.

(21) Appl. No.: 17/395,046

(22) Filed: Aug. 5, 2021

(65) Prior Publication Data

US 2023/0037567 A1    Feb. 9, 2023

(51) Int. Cl.
*G06F 21/62* (2013.01)
*G06F 16/93* (2019.01)
(Continued)

(52) U.S. Cl.
CPC .......... *G06F 21/6218* (2013.01); *G06F 16/93* (2019.01); *G06K 7/1417* (2013.01);
(Continued)

(58) Field of Classification Search
CPC .. G06F 21/62; G06F 21/6218; G06F 21/6209; G06F 16/93; H04L 9/30;
(Continued)

(56) References Cited

U.S. PATENT DOCUMENTS 6,314,439 B1    11/2001  Bates et al.
7,051,206 B1 *   5/2006  Giest ..................... H04L 9/3226
                                                              380/282
(Continued)

FOREIGN PATENT DOCUMENTS

CN    101006447 B  * 12/2010  ........... G06F 21/335
CN    107395574 A  * 11/2017  ......... H04L 63/0428
(Continued)

OTHER PUBLICATIONS

Ms. Neha Malik and Dr. Bharti Joshi, (ECDSA Approach for Reliable Data Sharing and Document Verification using Two level QR code), p. 4; IEEE Publication Date (Year: 2018).*

(Continued)

*Primary Examiner* — Eleni A Shiferaw
*Assistant Examiner* — Ali H. Cheema

(57) ABSTRACT

A device configured to identify a first digital document in a digital document repository, to identify a first graphical code that represents the first digital document, and to send the first graphical code to an approved user device. The device is further configured to obtain a second graphical code that represents a public encryption key for the organization and to extract the public encryption key for an organization from the second graphical code. The device is further configured to obtain a third graphical code from the approved user device. The third graphical code represents a second digital document comprising data and a digital signature that was signed using a private encryption key for the organization. The device is further configured to determine the third graphical code passes validation using the public encryption key for the organization and to store the second digital document in a digital document repository.

20 Claims, 4 Drawing Sheets

(51) Int. Cl.
*H04L 9/30* (2006.01)
*G06K 19/06* (2006.01)
*H04L 9/32* (2006.01)
*G06K 7/14* (2006.01)

(52) U.S. Cl.
CPC .......... *G06K 19/06037* (2013.01); *H04L 9/30* (2013.01); *H04L 9/3242* (2013.01); *H04L 9/3247* (2013.01); *G06F 21/6209* (2013.01)

(58) Field of Classification Search
CPC ....... H04L 9/32; H04L 9/3226; H04L 9/3236; H04L 9/3242; H04L 9/3247; H04L 9/08; H04L 9/0894; G06K 7/1417; G06K 19/06037; G06Q 30/012
See application file for complete search history.

(56) References Cited

U.S. PATENT DOCUMENTS

| | | | |
|---|---|---|---|
| 7,058,630 | B2 | 6/2006 | Houston et al. |
| 7,254,772 | B2 | 8/2007 | Penke et al. |
| 7,434,048 | B1 | 10/2008 | Shapiro et al. |
| 7,627,569 | B2 | 12/2009 | Gafter |
| 7,668,873 | B2 | 2/2010 | Davis et al. |
| 7,802,111 | B1 | 9/2010 | Tahan |
| 8,009,829 | B2 | 8/2011 | Jueneman et al. |
| 8,161,527 | B2 | 4/2012 | Curren |
| 8,291,471 | B2 | 10/2012 | Piccinini et al. |
| 8,611,544 | B1 | 12/2013 | Herbach et al. |
| 8,620,818 | B2 | 12/2013 | Hughes et al. |
| 9,118,666 | B2 | 8/2015 | Naguib |
| 9,137,014 | B2 | 9/2015 | Herbach et al. |
| 9,276,910 | B2 | 3/2016 | Tang et al. |
| 9,369,287 | B1 * | 6/2016 | Sarvestani ............... G07D 7/01 |
| 9,565,175 | B1 * | 2/2017 | Saylor ................... H04L 67/125 |
| 10,009,179 | B2 | 6/2018 | Acar et al. |
| 10,025,932 | B2 | 7/2018 | Thom et al. |
| 10,074,085 | B2 | 9/2018 | Radu et al. |
| 10,270,748 | B2 | 4/2019 | Briceno et al. |
| 10,346,836 | B2 | 7/2019 | Karlsson |
| 10,447,486 | B2 | 10/2019 | Turissini et al. |
| 10,581,597 | B2 * | 3/2020 | Shen ............... G06K 19/06037 |
| 10,630,648 | B1 * | 4/2020 | Borunda ............. H04W 12/068 |
| 10,637,665 | B1 | 4/2020 | Sundaresan |
| 10,700,861 | B2 | 6/2020 | Sundaresan et al. |
| 10,715,311 | B2 | 7/2020 | Sundaresan et al. |
| 10,715,312 | B2 | 7/2020 | Sundaresan et al. |
| 10,735,197 | B2 | 8/2020 | Sundaresan et al. |
| 11,243,907 | B2 * | 2/2022 | Shah ..................... G06V 30/40 |
| 2001/0047476 | A1 * | 11/2001 | Yen ....................... G06T 1/0028 |
| | | | 713/168 |
| 2003/0110131 | A1 | 6/2003 | Alain et al. |
| 2003/0182578 | A1 | 9/2003 | Warnock et al. |
| 2004/0006575 | A1 | 1/2004 | Visharam et al. |
| 2005/0038754 | A1 * | 2/2005 | Geist .................... H04L 9/3066 |
| | | | 705/64 |
| 2005/0166051 | A1 | 7/2005 | Buer |
| 2006/0072144 | A1 * | 4/2006 | Dowling ............... G06F 21/606 |
| | | | 358/1.15 |
| 2006/0167737 | A1 | 7/2006 | Muller et al. |
| 2007/0033637 | A1 | 2/2007 | Yami et al. |
| 2007/0118554 | A1 | 5/2007 | Chang et al. |
| 2007/0198612 | A1 | 8/2007 | Prahlad et al. |
| 2008/0022412 | A1 | 1/2008 | Challener et al. |
| 2008/0183691 | A1 | 7/2008 | Kwok et al. |
| 2010/0250488 | A1 * | 9/2010 | Mayer ................... G06Q 10/06 |
| | | | 707/812 |
| 2010/0250538 | A1 * | 9/2010 | Richards ............... G06Q 10/06 |
| | | | 707/E17.014 |
| 2011/0137947 | A1 | 6/2011 | Dawson et al. |
| 2012/0023335 | A1 * | 1/2012 | Bals ................... H04N 1/32133 |
| | | | 713/176 |
| 2012/0233544 | A1 | 9/2012 | Roy |
| 2012/0284602 | A1 * | 11/2012 | Seed .................. G06Q 20/3274 |
| | | | 715/224 |
| 2012/0308003 | A1 * | 12/2012 | Mukherjee ........... H04L 9/3247 |
| | | | 380/243 |
| 2013/0019105 | A1 | 1/2013 | Hussain |
| 2013/0198522 | A1 | 8/2013 | Kohno et al. |
| 2014/0172915 | A1 | 6/2014 | Herbach |
| 2014/0254796 | A1 * | 9/2014 | Li ......................... H04L 9/3263 |
| | | | 380/246 |
| 2014/0359294 | A1 * | 12/2014 | Armitage ......... G06K 19/06037 |
| | | | 235/494 |
| 2015/0019440 | A1 * | 1/2015 | Yang ..................... H04L 9/3226 |
| | | | 705/65 |
| 2015/0052615 | A1 * | 2/2015 | Gault .................... G06F 21/645 |
| | | | 726/26 |
| 2015/0356306 | A1 * | 12/2015 | Carter ..................... G06F 21/64 |
| | | | 380/246 |
| 2015/0358163 | A1 * | 12/2015 | Carter .................. G06F 21/645 |
| | | | 713/179 |
| 2015/0358164 | A1 * | 12/2015 | Carter ..................... G09C 5/00 |
| | | | 713/179 |
| 2016/0063480 | A1 | 3/2016 | Ballesteros et al. |
| 2016/0065571 | A1 * | 3/2016 | Hoyos ................. H04L 63/0428 |
| | | | 713/168 |
| 2016/0087949 | A1 * | 3/2016 | Deleeuw ............... H04W 12/50 |
| | | | 713/170 |
| 2016/0218875 | A1 | 7/2016 | Le Saint et al. |
| 2017/0011051 | A1 * | 1/2017 | Specht ..................... G06F 16/93 |
| 2017/0111170 | A1 | 4/2017 | Baghdasaryan |
| 2017/0134167 | A1 * | 5/2017 | Carter ..................... G09C 5/00 |
| 2017/0286415 | A1 * | 10/2017 | Kumar .................... G06F 16/93 |
| 2018/0101850 | A1 | 4/2018 | Pisut, IV et al. |
| 2018/0150810 | A1 * | 5/2018 | Lee ........................ G06F 21/606 |
| 2018/0205556 | A1 * | 7/2018 | Rieul .................... H04L 9/3247 |
| 2019/0018845 | A1 * | 1/2019 | McCaffrey ............ G06F 16/338 |
| 2019/0026271 | A1 * | 1/2019 | Kumar .................... G06F 16/93 |
| 2019/0044727 | A1 * | 2/2019 | Scott ..................... H04L 9/0891 |
| 2020/0007576 | A1 * | 1/2020 | Buhacoff .............. H04L 9/3271 |
| 2020/0258176 | A1 * | 8/2020 | Gibson .................... G06F 21/32 |
| 2020/0267280 | A1 * | 8/2020 | Tong ..................... G06F 21/6209 |
| 2021/0004772 | A1 * | 1/2021 | Dolan .................. G06Q 20/381 |
| 2021/0004773 | A1 * | 1/2021 | Dolan .................. G06Q 20/027 |
| 2021/0203508 | A1 * | 7/2021 | Decoux ................ G06F 16/9035 |
| 2021/0366014 | A1 * | 11/2021 | Wang ..................... G06F 21/36 |
| 2022/0150073 | A1 * | 5/2022 | Androulaki ........ G06K 7/10722 |

FOREIGN PATENT DOCUMENTS

| | | | | |
|---|---|---|---|---|
| CN | 109147892 A | * | 1/2019 | ........... G06K 7/1417 |
| CN | 109147893 A | * | 1/2019 | ........... G06K 7/1413 |
| CN | 109147900 A | * | 1/2019 | ........... G06K 7/1417 |
| EP | 1225500 A2 | | 7/2002 | |
| EP | 3413506 A1 | * | 12/2018 | ........ G06Q 20/0453 |
| JP | 6277868 B2 | * | 2/2018 | |
| JP | 2020516092 A | * | 5/2020 | ........... H04L 9/0861 |
| KR | 20090122657 A | * | 12/2009 | ........... H04L 9/3263 |
| KR | 20150044150 A | * | 4/2015 | ........ G06F 21/6227 |
| KR | 101934444 B1 | * | 1/2019 | ............... H04L 9/06 |
| KR | 102032131 B1 | * | 10/2019 | ............. G06F 21/62 |
| RU | 2647642 C1 | * | 3/2018 | ............. G06F 21/64 |
| WO | 0237294 A1 | | 5/2002 | |
| WO | WO-2005066884 A1 | * | 7/2005 | ....... G06K 19/06037 |
| WO | WO-2010131415 A1 | * | 11/2010 | ........... H04L 9/0866 |
| WO | 2015124726 A1 | | 8/2015 | |
| WO | WO-2016126090 A1 | * | 8/2016 | ............ G06F 16/137 |
| WO | WO-2016173993 A1 | * | 11/2016 | ............. G06F 21/43 |
| WO | 2019177563 A1 | | 9/2019 | |
| WO | WO-2020245024 A1 | * | 12/2020 | ............. G06F 21/16 |

OTHER PUBLICATIONS

Odesha Lewis and Sean Thorpe, (Authenticating Motor Insurance Documents using QR Codes), p. 7; IEEE Publication Date (Year: 2019).*

(56) References Cited

OTHER PUBLICATIONS

Morgan, B.C. et al., "Digital Document Repository Access Control Using Encoded Graphical Codes," U.S. Appl. No. 17/394,886, filed Aug. 5, 2021, 31 pages.

* cited by examiner

ACCESS CONTROL FOR UPDATING DOCUMENTS IN A DIGITAL DOCUMENT REPOSITORY

TECHNICAL FIELD

The present disclosure relates generally to information security, and more specifically to access control for updating documents in a digital document repository.

BACKGROUND

In a network environment, devices are in data communication with other devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as user devices, databases, and servers, are vulnerable to attacks. This vulnerability poses several network security challenges. Existing systems are typically unable to detect a network attack until after the attack has occurred. For example, a bad actor may store malicious files or documents in a memory which then allows the bad actor to gain unauthorized access to other files or documents that are also stored in the memory. Having a delayed response allows the bad actor to gain access to sensitive information within the network and/or allows bad actors to perform other malicious activities such as data exfiltration or uploading malware.

SUMMARY

The disclosed system provides several practical applications and technical advantages that overcome the previously discussed technical problems. For example, the disclosed system provides a practical application by providing a process that allows a device to validate digital documents using encoded graphical codes before storing the digital documents in memory. This process generally involves extracting a public encryption key that is encoded in a graphical code and then using the public encryption key to validate a digital signature that is embedded within a digital document. The digital document itself is also encoded as a different graphical code. This process improves information security by allowing the device to validate the digital signature of digital documents before the digital documents are stored in memory. This process provides a technical advantage by enabling the device to reject digital documents that do not successfully pass validation which helps to prevent malicious documents from being stored in memory. This also provides the technical advantage of obfuscating the data within a digital document by using an encoded graphical code. This process prevents other people (e.g. bad actors) from being able to read or access the data within the digital document until the digital document has been decoded and stored in memory.

Improving information security for the system also improves the underlying network and the devices within the network. For example, when a data exfiltration attack occurs, there is an increase in the number of network resources and bandwidth that are consumed which reduces the throughput of the network. By preventing data exfiltration attacks, the system is able to prevent any unnecessary increases in the number of network resources and bandwidth that are consumed that would otherwise negatively impact the throughput of the system. As another example, when a malware attack occurs, one or more devices may be taken out of service until the malware can be removed from the devices. Taking devices out of service negatively impacts the performance and throughput of the network because the network has fewer resources for processing and communicating data. By preventing malware types of attacks, the system prevents any comprised devices from being taken out of service due to an attack that would otherwise negatively impact the performance and throughput of the network.

In one embodiment, the information system comprises a device that is configured to obtain a first graphical code that represents a public encryption key for an organization and to extract the public encryption key for the organization from the first graphical code. The device is further configured to obtain a second graphical code that represents a digital document that comprises data and a collision mitigating version of the data (e.g. a hash) that was signed using a private encryption key for the organization. The device is further configured to extract the digital document from the second graphical code and to validate the second graphical code using the public encryption key for the organization. The device is further configured to determine the second graphical code passes validation using the public encryption key for the organization and to store the digital document in a digital document repository.

In another embodiment, the information system comprises a device that is configured to identify a first digital document in a digital document repository, to identify a first graphical code that represents the first digital document, and to send the first graphical code to an approved user device. The device is further configured to obtain a second graphical code that represents a public encryption key for the organization and to extract the public encryption key for an organization from the second graphical code. The device is further configured to obtain a third graphical code from the approved user device. The third graphical code represents a second digital document that comprises data and a collision mitigating version of the data that was signed using a private encryption key for the organization. The device is further configured to determine the third graphical code passes validation using the public encryption key for the organization and to store the second digital document in a digital document repository.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
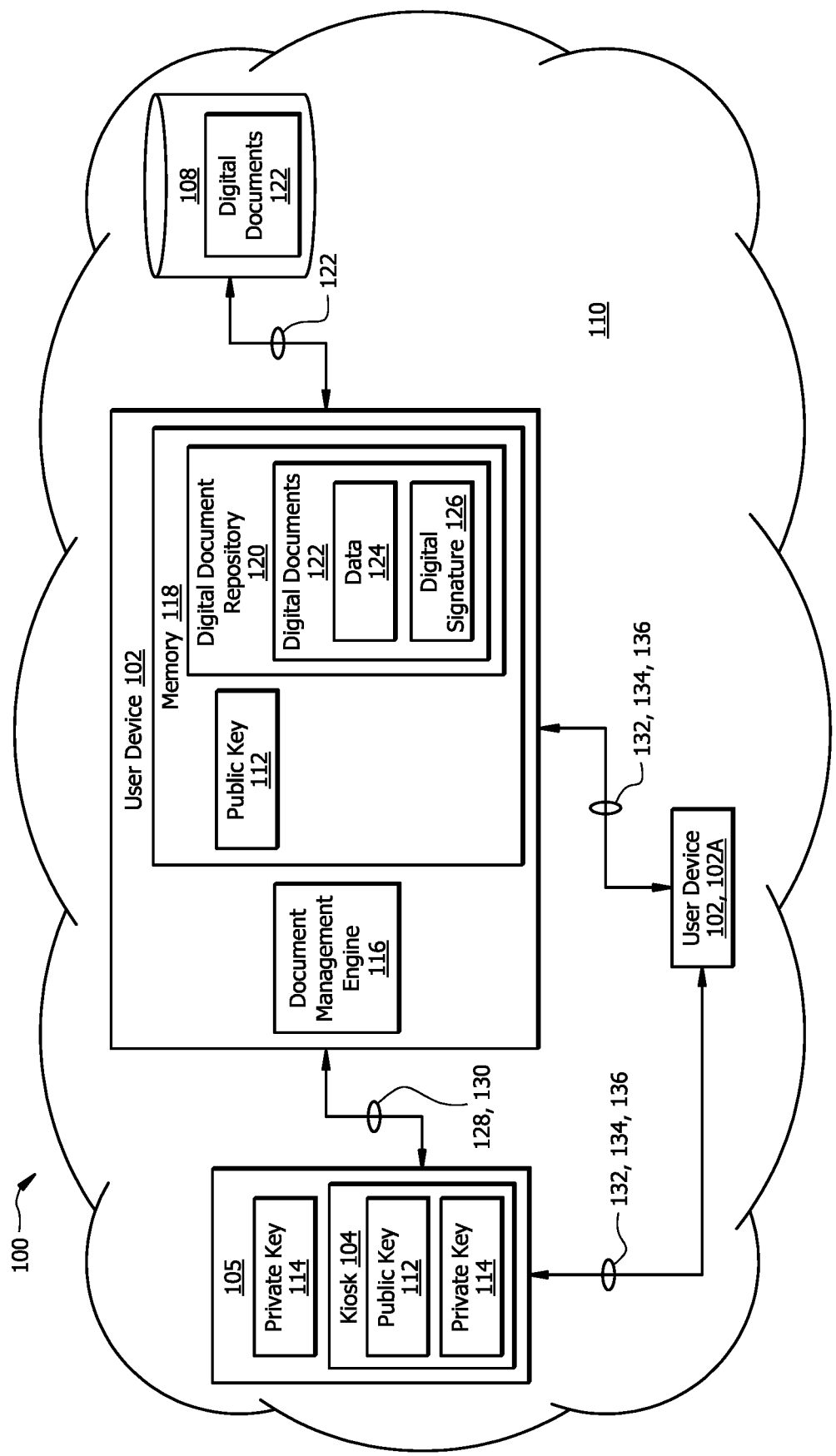
FIG. 1 is a schematic diagram of an embodiment of an information system that is configured to employ a digital document repository.

FIG. 1 is a schematic diagram of an embodiment of an information system 100 that is configured to employ a digital document repository 120. The information system 100 is generally configured to encode information and to validate digital documents 122 using encoded graphical codes. This process generally involves a user device 102 obtaining a first graphical code (e.g. a first Quick Response (QR) code) that is encoded with a public encryption key 112 and extracting the public encryption key 112 from the first graphical code. The user device 102 then obtains a digital document 122 that is encoded using a second graphical code (e.g. a second QR code) that is different from the first graphical code. The digital document 122 comprises data 124 and a digital signature 126 that was signed using a private encryption key 114. The digital signature 126 comprises a collision mitigating version of the data 124, for example, a hash. The user device 102 uses the previously extracted public encryption key 112 to validate the digital signature 126 of the digital document 122. The user device 102 may then store the digital document 122 in a digital document repository 120 after determining that the digital signature 126 of the digital document 122 passes validation. This process provides information security for the digital document repository 120 by only storing digital documents 122 that are associated with valid digital signatures 126. This process prevents potentially malicious digital documents 122 from being stored within the digital document repository 120.

In one embodiment, the information system 100 comprises one or more user devices 102, a kiosk 104, and a database 108 that are in signal communication with each other over a network 110. The network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), a Bluetooth network, a WiFi network, a Near Field Communication (NFC) network, and a satellite network. The network 110 may be configured to support any suitable type of communication protocol as would be appreciated by one of ordinary skill in the art.

Kiosk

A kiosk 104 is a device that is located in a space 105 is associated with an organization or a business that provides services or products to users. Examples of the kiosk 104 include, but are not limited to, a computer, tablet, a point-of-sale device, a card reader, or any other suitable type of device. For example, the kiosk 104 may be a device in a store where a user is shopping. As another example, the kiosk 104 may be device in a location where a user can rent items or supplies. A public encryption key 112 and a private encryption key 114 are both assigned to the organization. The private encryption key 114 is a string of numeric values (e.g. hexadecimal values or binary values) that are used for encrypting data and generating a digital signature 126. The public encryption key 112 is a string of numeric values that are used for decrypting data and validating digital signatures that are signed using the private encryption key 114. The private encryption key 114 and the public encryption key 112 may be any suitable type of key that can be used for encrypting and decrypting data. The public encryption key 112 can be encoded into a graphical code. Examples of a graphical code include, but are not limited to, a barcode, a two-dimensional barcode (e.g. QR code), a symbol, or any other suitable type of encoded graphical representation. The graphical code for the public encryption key 112 is readily available and is sharable with the public. For example, the graphical code for the public encryption key 112 may be displayed on the kiosk 104 or at the space 105 where the kiosk 104 is present, for example, within a store.

User Devices

Examples of user devices 102 include, but are not limited to, a smartphone, a tablet, a laptop, a computer, a smart device, an Internet-of-Things (IoT) device, or any other suitable type of device. In one embodiment, a user device 102 comprises a document management engine 116 and a memory 118. Additional details about the hardware configuration of the user device 102 are described in FIG. 4. The memory 118 is configured to store a digital document repository 120, digital documents 122, data 124, digital signatures 126, public encryption keys 112 for organizations, and/or any other suitable type of data.

In one embodiment, the document management engine 116 is generally configured to use graphical codes to store digital documents 122 in the digital document repository 120. The digital document repository 120 is a portion of the memory that is allocated to securely storing digital documents 122. For example, the digital document repository 120 may be accessible using an application on the user device 102 after providing authentication credentials for a user. Examples of authentication credentials include, but are not limited to, a username and password, a security code, a token code, a personal identification number (PIN), a fingerprint, biometric information, or any other suitable type or combination of user input that can be used to authenticate a user.

In one embodiment, a digital document 122 comprises data 124 and a digital signature 126. Examples of data 124 include, but are not limited to, text, images, documents, files, video files, audio files, or any other suitable type of data. As an example, the data 124 may be a document that identifies a purchase of one or more items from an organization. In this example, the data 124 may be a document that identifies one or more items, a timestamp, transaction information, and/or any other suitable type of information associated with the purchase. As another example, the data 124 may be a document that comprises a warranty, guarantee, or contract that is associated with an organization. In this example, the data 124 may be a document that identifies one or more items, a timestamp, terms of conditions, and/or any other suitable type of information. The digital signature 126 is a security feature that is provided by an organization to verify the authenticity of a digital document 122 and its data 124. In one embodiment, the digital signature 126 may be generated by performing a hashing operation on the data 124 to generate a hash value and then encrypting the hash value using a private encryption key 114 to generate the digital signature 126. In other embodiments, the digital signature 126 may be generated using any other suitable technique.

Databases

Examples of a database 108 include, but are not limited to, file repositories, computers, databases, memories, servers, shared folders, or any other suitable type of networking device. The database 108 is generally configured to store digital documents 122 and/or any other suitable type of information that is associated with the information system 100. In FIG. 1, the information system 100 shows a single database 108. In other embodiments, the information system 100 may comprise any other suitable number of databases 108.

Digital Document Storing Process

Figure 2:
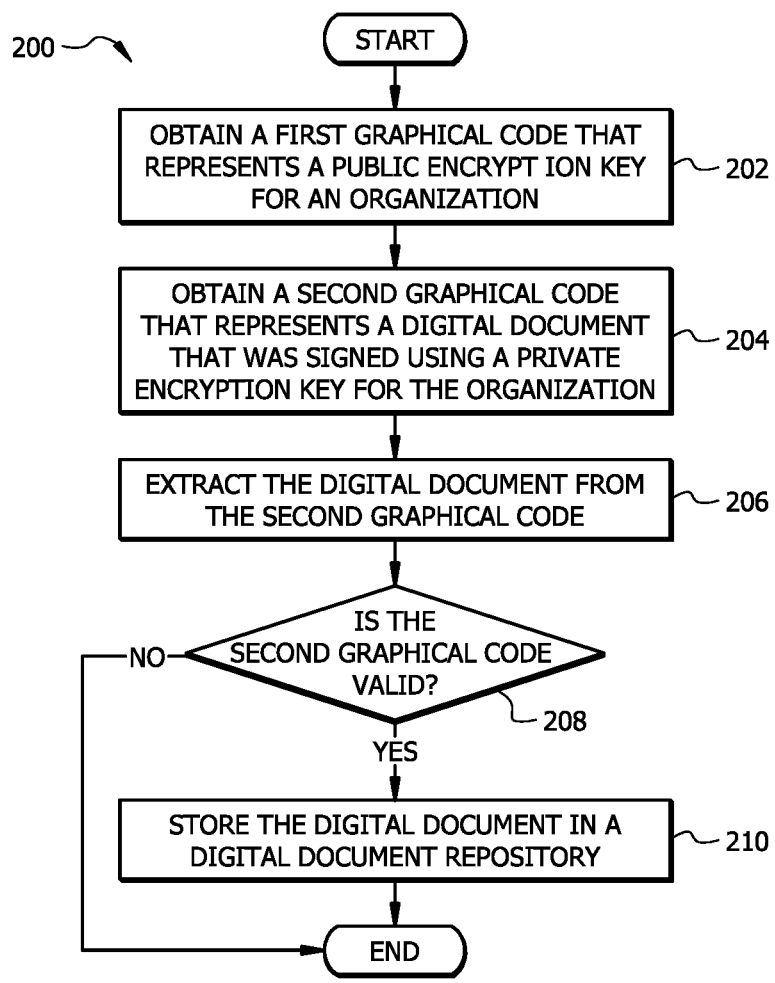
FIG. 2 is a flowchart of an embodiment of a digital document storing process for the information system.

FIG. 2 is a flowchart of an embodiment of a digital document storing process 200 for the information system 100. The information system 100 may employ process 200 to securely store digital documents 122 within a digital document repository 120 after the digital documents 122 pass validation using encoded graphical codes. This process provides information security for the digital document repository 120 by only storing digital documents 122 that are associated with valid digital signatures 126.

At step 202, the user device 102 obtains a first graphical code 128 that represents a public encryption key 112 for an organization. As an example, the first graphical code 128 may be a QR code that is displayed at a location (e.g. a store) where a kiosk 104 is present. In this example, a user may capture an image of the first graphical code 128 using a camera 406 on the user device 102. As another example, the first graphical code 128 may be a QR code that is displayed online on a web page that is associated with the organization. In this example, the user may download an image of the first graphical code 128 onto their user device 102. In other examples, the user may use any other suitable technique to copy an image of the first graphical code 128 onto the user device 102. After obtaining the first graphical code 128, the user device 102 decodes the first graphical code 128 to extract the public encryption key 112 from the first graphical code 128. For example, the user device 102 may input the first graphical code 128 into a QR code reader to read the first graphical code 128 and to extract the public encryption key 112 from the first graphical code 128. In other examples, the user device 102 may employ image processing or any other suitable technique to decode and extract the public encryption key 112 from the first graphical code 128. In some embodiments, the user device 102 may validate the public encryption key 112 using a key (e.g. a public encryption key) from an external certification authority. This process allows the user device 102 to confirm that the public encryption key 112 is valid and comes from a trusted or reputable source.

At step 204, the user device 102 obtains a second graphical code 130 that represents a digital document 122 that was signed using a private encryption key 114 for the organization. As an example, the digital document 122 may comprise data 124 that corresponds with a receipt or a warranty for one or more items that a user obtains or purchases from the organization. In other examples, the digital document 122 may include any other suitable type of data 124. The kiosk 104 then generates a digital signature 126 that will be included in the digital document 122. For instance, the kiosk 104 may perform a hashing operation on the data 124 to generate a hash value and then encrypt the hash value with the private encryption key 114 for the organization to generate the digital signature 126. In other embodiments, the kiosk 104 may generate the digital signature 126 using any other suitable technique. After generating the digital signature 126, the kiosk 104 converts the data 124 and the digital signature 126 into the second graphical code 130 (e.g. a QR code) by encoding the data 124 and the digital signature 126. The kiosk 104 may use any suitable type of encoding technique to convert the digital document 122 into the second graphical code 130. In some embodiments, the kiosk 104 may generate more than one graphical code when the size of data 124 exceeds the size limit of data that can be represented using a single graphical code.

After generating the second graphical code 130, the kiosk 104 outputs the second graphical code 130 to the user device 102. The kiosk 104 may employ any suitable technique for outputting the second graphical code 130 to the user device 102. For example, the kiosk 104 may display the second graphical code 130 on a graphical user interface (e.g. a display) of the kiosk 104. In this example, the user device 102 may capture an image of the second graphical code 130 to obtain the second graphical code 130. As another example, the kiosk 104 may print out the second graphical code 130 onto a physical document. In this example, the user device 102 may capture an image of the second graphical code 130 on the physical document to obtain the second graphical code 130. As another example, the kiosk 104 may send a message or an email that includes the second graphical code 130 to the user device 102. In this example, the user device 102 may download an image of the second graphical code 130 from the message or email to obtain the second graphical code 130.

After obtaining the second graphical code 130, the user device 102 will process the second graphical code 130 to determine whether the second graphical code 130 corresponds with a valid digital document 122 based on digital signature 126 of the digital document 122. At step 206, the user device 102 extracts the digital document 122 from the second graphical code 130. In one embodiment, the user device 102 may input the second graphical code 130 into a QR code reader to read the second graphical code 130 and to extract the data 124 and the digital signature 126 of the digital document 122 from the second graphical code 130. Through this process, the user device 102 converts the second graphical code 130 back into the original format of the data 124. For example, the user device 102 may convert the second graphical code 130 into text, images, documents, files, or any other suitable type of data format. In other examples, the user device 102 may employ image processing or any other suitable technique to extract the data 124 and the digital signature 126 from the second graphical code 130.

At step 208, the user device 102 determines whether the second graphical code 130 is valid. After extracting the data 124 and the digital signature 126 from the second graphical code 130, the user device 102 performs a hashing operation on the data 124 to generate a first hash. The user device 102 then decrypts the digital signature 126 using the public encryption key 112 for the organization to recover a second hash. The user device 102 then compares the first hash to the second hash to determine whether the digital signature 126 and the second graphical code 130 are valid. The user device 102 determines that the second graphical code 130 is valid when the first hash matches the second hash. Otherwise, the user device 102 determines that the second graphical code 130 is invalid when the first hash does not match this second hash. In other embodiments, the user device 102 may employ any other suitable technique for validating the second graphical code 130.

The user device 102 terminates process 200 in response to determining that the second graphical code 130 is invalid. In this case, the user device 102 will not store the digital document 122 in the digital document repository 120 since the second graphical code 130 fails validation. This process provides information security for the digital document repository 120 by only storing digital documents 122 that are associated with valid digital signatures 126. The user device 102 proceeds to step 210 in response to determining that the second graphical code 130 is valid. In this case, the user device 102 proceeds to step 210 to store the digital document 122 in the digital document repository 120.

At step 210, the user device 102 stores the digital document 122 in the digital document repository 120. Here, the user device 102 may store the digital document 122, the data 124, the digital signature 126, and/or the second graphical code 130. In some embodiments, the user device 102 may be further configured to store a copy of the digital document 122, the data 124, the digital signature 126, and/or the second graphical code 130 in a remote database 108. For example, the user device 102 may generate a copy of the digital document 122 and send the copy of the digital document 122 to the remote database 108. This process allows the user device 102 to store copies of the digital document 122 that can be accessed or downloaded by other devices. For example, this process allows a user to access and view their digital documents 122 using another user device 102.

Digital Document Updating Process

Figure 3:
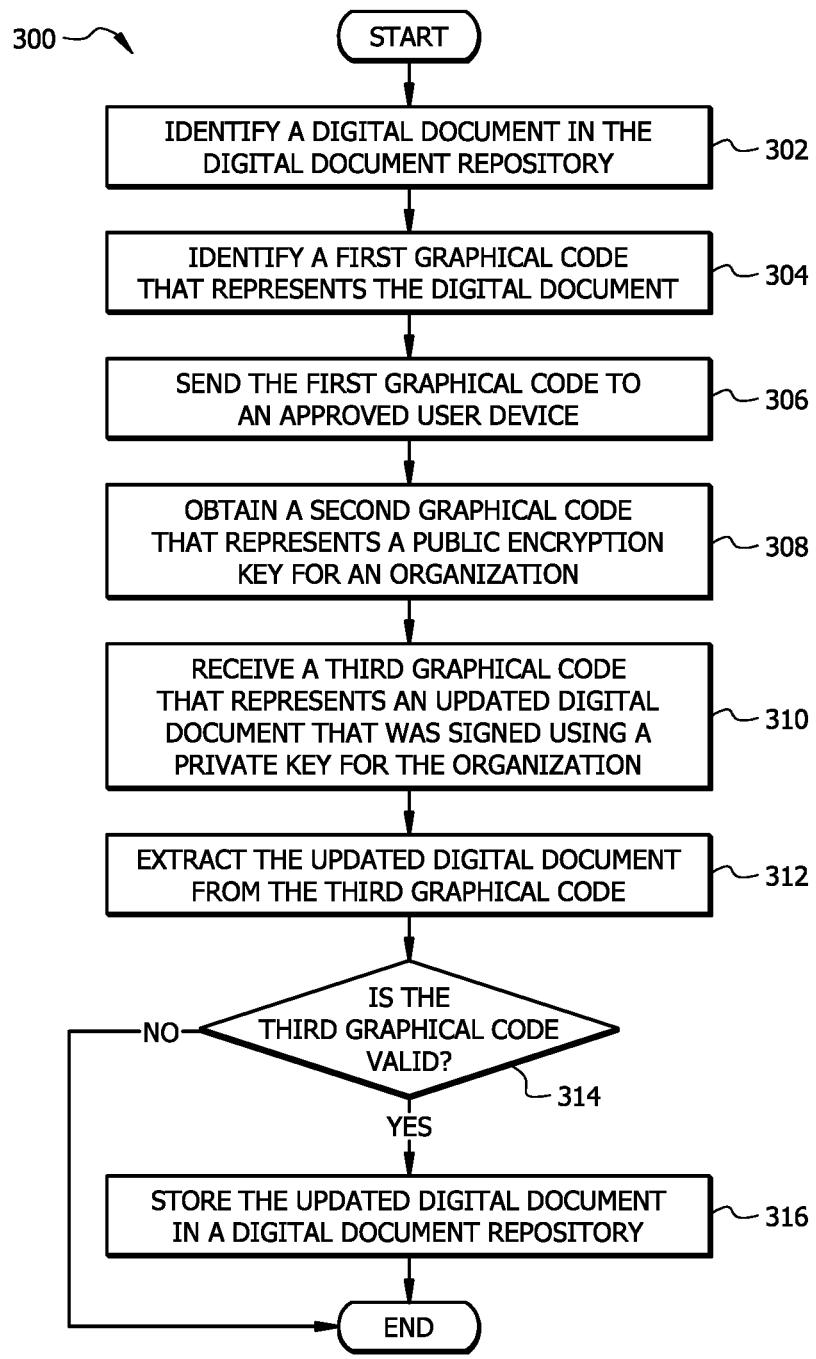
FIG. 3 is a flowchart of an embodiment of a digital document updating process for the information system.

FIG. 3 is a flowchart of an embodiment of a digital document updating process 300 for the information system 100. The information system 100 may employ process 300 to authorize other people to perform actions on behalf of the user using the digital document 122 that are stored in the user's digital document repository 120. Process 300 allows the user to share a digital document 122 as an encoded graphical code which allows the authorized person to use the digital document 122 on behalf of the user. After the authorized person has completed some action using the digital document 122, the digital document 122 is then updated and returned back to the user for storing in their digital document repository 120. This process allows the user device 102 to store the updated digital documents 122 within a digital document repository 120 after the updated digital documents 122 pass validation using graphical codes.

As an example, a user may want to send a digital document 122 to another person to authorize the person to perform actions on behalf of the user using the digital document 122. For example, the user may authorize the person to return or exchange one or more items that are identified on a digital document 122. As another example, the user may authorize the person to initiate a warranty claim using the digital document 122. In other examples, the user may authorize the person to perform any other suitable type of action using the digital document 122. At step 302, the user device 102 identifies a digital document 122 in the digital document repository 120. The user may identify a digital document 122 by accessing the digital documents 122 in the digital document repository 120 and then selecting (e.g. clicking) the digital document 122 from among the digital documents 122 in the digital document repository 120. In other examples, the user may use any other suitable technique to identify a digital document 122 within the digital document repository 120.

At step 304, the user device 102 identifies a first graphical code 132 that represents the digital document 122. In one embodiment, the user device 102 identifies a first graphical code 132 (e.g. a QR code) that was previously stored and associated with the identified digital document 122. In another embodiment, the user device 102 may create or recreate the first graphical code 132. For example, the user device 102 may convert the digital document 122 into the first graphical code 132 by encoding text from the digital document 122 into a QR code. The user device 102 may use any suitable technique for converting the digital document 122 into the first graphical code 132.

At step 306, the user device 102 sends the first graphical code 132 to an approved user device 102A. The user device 102 begins by identifying another user device 102A that will be used by the person that is authorized to perform actions using the digital document 122 on behalf of the user. The user device 102 may identify the approved user device 102A using a device name, a phone number, an email address, an Media Access Control (MAC) address, an Internet Protocol (IP) address, or any other suitable identifier that identifies the approved user device 102A. After identifying the approved user device 102A, the user device 102 may use any suitable messaging technique to send the first graphical code 132 to the approved user device 102A. For example, the user device 102 may send the first graphical code 132 to the approved user device 102A as a media message or an email. As another example, the user device 102 may send the first graphical code 132 to the approved user device 102A using over a Bluetooth connection, a WiFi connection, an NFC connection, an RFID connection, or any other suitable type of connection.

At step 308, the user device 102 obtains a second graphical code 134 that represents a public encryption key 112 for an organization. In one embodiment, the user device 102 may receive the second graphical code 134 (e.g. a QR code) from the approved user device 102A. For example, the approved user device 102A may send the second graphical code 134 to the user device 102 as a message. In this example, the approved user device 102A may use any suitable messaging technique to send the second graphical code 134 to the user device 102. In some embodiments, the user device 102 may obtain the second graphical code 134 from memory 118 or the digital document repository 120. For example, the user device 102 may have previously stored the second graphical code 134 in memory when the digital document 122 was stored. In some embodiments, the second graphical code 134 may be displayed online on a web page that is associated with the organization. In this example, a user may download an image of the second graphical code 134 onto the user device 102.

At step 310, the user device 102 receives a third graphical code 136 that represents an updated digital document 122 that was signed using a private encryption key 114 for the organization. The updated digital document 122 includes data 124 that has been revised or updated after a user of the approved user device 102A performs some action using the digital document 122. As an example, the user of the approved user device 102A may return or exchange one or more items that are identified on the digital document 122. As another example, the user of the approved user device 102A may initiate a warranty claim using the digital document 122. In other examples, the user of the approved user device 102A may perform any other suitable type of action using the digital document 122.

After the user performs an action using the digital document 122, the kiosk 104 may update the data 124 within digital document 122 and generate a new digital signature 126 for the digital document 122. As an example, the kiosk 104 may perform a hashing operation on the updated data 124 to generate a hash value and then encrypt the hash value with the private encryption key 114 for the organization to generate a new digital signature 126. In other embodiments, the kiosk 104 may generate the new digital signature 126 using any other suitable technique. After generating the new digital signature 126, the kiosk 104 may then encode the updated data 124 and the new digital signature 126 as the third graphical code 136 (e.g. a QR code). The kiosk 104 may use any suitable type of encoding technique to convert the digital document 122 into the third graphical code 136. This process allows the kiosk 104 to generate an updated digital document 122 that is a modified version of the original digital document 122.

After generating the third graphical code 136, the kiosk 104 outputs the third graphical code 136 to the approved user device 102A. The kiosk 104 may employ any suitable technique for outputting the third graphical code 136 to the approved user device 102A. For example, the kiosk 104 may display the third graphical code 136 on a graphical user interface (e.g. a display) of the kiosk 104. In this example, the approved user device 102A may capture an image of the third graphical code 136 to obtain the third graphical code 136. As another example, the kiosk 104 may print out the third graphical code 136 onto a physical medium or document. In this example, the approved user device 102A may capture an image of the third graphical code 136 on the physical document to obtain the third graphical code 136. As another example, the kiosk 104 may send a message or an email that includes the third graphical code 136 to the approved user device 102A. In this example, the approved user device 102A may download an image of the third graphical code 136 from the message or email to obtain the third graphical code 136.

After the approved user device 102A obtains the third graphical code 136, the approved user device 102A sends the third graphical code 136 back to the user device 102. In this example, the approved user device 102A may use any suitable messaging technique to send the third graphical code 136 to the user device 102. For example, the approved user device 102A may send the third graphical code 136 to the user device 102 as a media message or an email. As another example, the approved user device 102A may send the third graphical code 136 to the user device 102 using over a Bluetooth connection, a WiFi connection, an NFC connection, an RFID connection, or any other suitable type of connection.

At step 312, the user device 102 extracts the updated digital document 122 from the third graphical code 136. In one embodiment, the user device 102 may input the third graphical code 136 into a QR code reader to read the third graphical code 136 and to extract the data 124 and the digital signature 126 of the digital document 122 from the third graphical code 136. Through this process, the user device 102 converts the third graphical code 136 back into the original format of the data 124. For example, the user device 102 may convert the third graphical code 136 into text, images, documents, files, or any other suitable type of data format. In other examples, the user device 102 may employ image processing or any other suitable technique to extract the data 124 and the digital signature 126 from the third graphical code 136.

At step 314, the user device 102 determines whether the third graphical code 136 is valid. After extracting the data 124 and the digital signature 126 from the third graphical code 136, the user device 102 performs a hashing operation on the data 124 to generate a first hash. The user device 102 then decrypts the digital signature 126 using the public encryption key 112 for the organization to recover a second hash. The user device 102 then compares the first hash to the second hash to determine whether the digital signature 126 and the third graphical code 136 are valid. The user device 102 determines that the third graphical code 136 is valid when the first hash matches the second hash. Otherwise, the user device 102 determines that the third graphical code 136 is invalid when the first hash does not match this second hash. In other embodiments, the user device 102 may employ any other suitable technique for validating the third graphical code 136.

The user device 102 terminates process 300 in response to determining that the third graphical code 136 is not valid. In this case, the user device 102 will not store the updated digital document 122 in the digital document repository 120 since the third graphical code 136 fails validation. This process provides information security for the digital document repository 120 by only storing digital documents 122 that are associated with valid digital signatures 126. The user device 102 proceeds to step 316 in response to determining that the third graphical code 136 is valid. In this case, the user device 102 proceeds to step 316 to store the updated digital document 122 in the digital document repository 120.

At step 316, the user device 102 stores the updated digital document 122 in the digital document repository 120. Here, the user device 102 may store the updated digital document 122, the data 124, the digital signature 126, and/or the third graphical code 136. In some embodiments, the user device 102 may be further configured to store a copy of the digital document 122, the data 124, the digital signature 126, and/or the third graphical code 136 in a remote database 108. For example, the user device 102 may generate a copy of the updated digital document 122 and send the copy of the updated digital document 122 to the remote database 108.

In some embodiments, the approved user device 102A may be configured to validate the updated digital document 122 before sending the updated digital document 122 to the user device 102. For example, the approved user device 102A may be configured to employ a process similar to process 200 that is described in FIG. 2 to validate the updated digital document 122. For redundancy and additional information security, the user device 102 may also validate the updated digital document 122 after the approved user device 102A validates the updated digital document 122.

Hardware Configuration for the User Device

Figure 4:
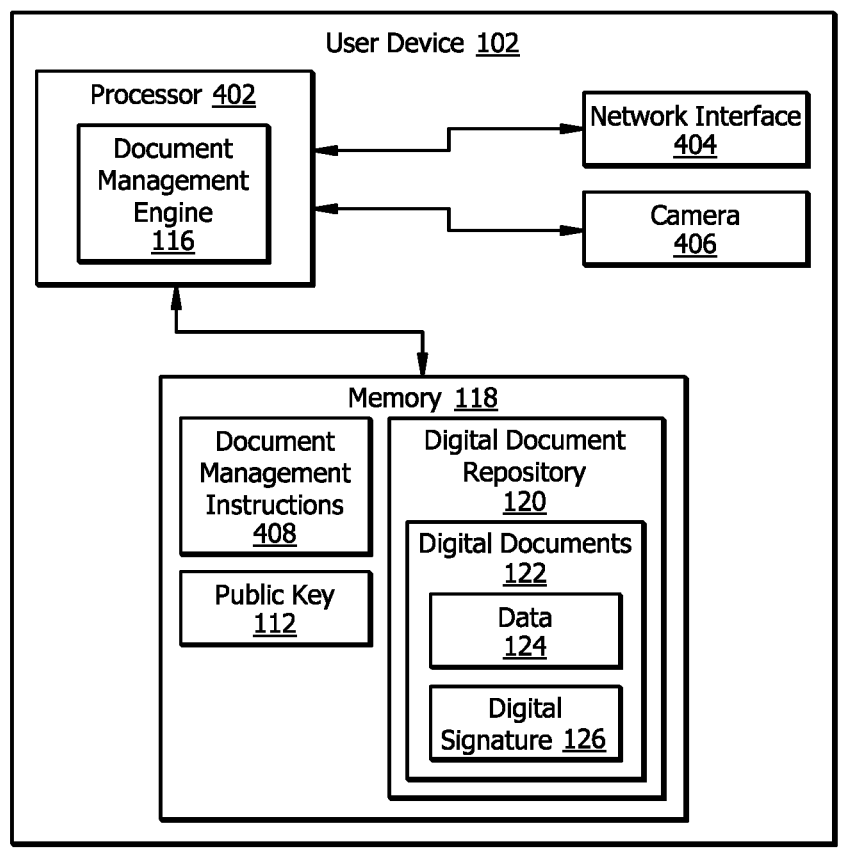
FIG. 4 is an embodiment of a device configured with a digital document repository.

FIG. 4 is an embodiment of a user device 102 for the information system 100. As an example, the user device 102 may be a smartphone or a computer. The user device 102 comprises a processor 402, a memory 118, a network interface 404, and a camera 406. The user device 102 may be configured as shown or in any other suitable configuration.

Processor

The processor 402 comprises one or more processors operably coupled to the memory 118. The processor 402 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 118, the network interface 404, and the camera 406. The one or more processors are configured to process data and may be implemented in hardware or software. For example, the processor 402 may be 8-bit, 16-bit, 32-bit, 64-bit, or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute document management instructions 408 to implement the document management engine 116. In this way, processor 402 may be a special-purpose computer designed to implement the functions disclosed herein. In an embodiment, the document management engine 116 is implemented using logic units, FPGAs, ASICs, DSPs, or any other suitable hardware. The document management engine 116 is configured to operate as described in FIGS. 1-3. For example, the document management engine 116 may be configured to perform the steps of process 200 and 300 as described in FIGS. 2 and 3, respectively.

Memory

The memory 118 is a hardware device that is operable to store any of the information described above with respect to FIGS. 1-3 along with any other data, instructions, logic, rules, or code operable to implement the function(s) described herein when executed by the processor 402. The memory 118 comprises one or more disks, tape drives, or solid-state drives, and may be used as an over-flow data storage device, to store programs when such programs are selected for execution, and to store instructions and data that are read during program execution. The memory 118 may be volatile or non-volatile and may comprise a read-only memory (ROM), random-access memory (RAM), ternary content-addressable memory (TCAM), dynamic random-access memory (DRAM), and static random-access memory (SRAM).

The memory 118 is operable to store document management instructions 408, public encryption keys 112, a digital document repository 120, digital documents 122, data 124, digital signatures 126, and/or any other data or instructions. The document management instructions 408 may comprise any suitable set of instructions, logic, rules, or code operable to execute the document management engine 116. The public encryption keys 112, the digital document repository 120, the digital documents 122, the data 124, and the digital signatures 126 are configured similar to the public encryption keys 112, the digital document repository 120, the digital documents 122, the data 124, and the digital signatures 126 described in FIGS. 1-3, respectively.

Camera

Examples of the camera 406 include, but are not limited to, charge-coupled device (CCD) cameras and complementary metal-oxide-semiconductor (CMOS) cameras. The camera 406 is configured to capture images of graphical codes, people, text, documents, and objects within a real environment. The camera 406 is configured to capture images continuously, at predetermined intervals, or on-demand. For example, the camera 406 is configured to receive a command from a user to capture an image. In another example, the camera 406 is configured to continuously capture images to form a video stream of images. The camera 406 is operable coupled to document management engine 116 and provides images to the document management engine 116 for processing, for example, to read a graphical code.

Network Interface

The network interface 404 is a hardware device that is configured to enable wired and/or wireless communications. The network interface 404 is configured to communicate data between user devices 106, kiosks 104, databases 108, and other devices, systems, or domains. For example, the network interface 404 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 402 is configured to send and receive data using the network interface 404. The network interface 404 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A digital document storing device, comprising:
a memory operable to store a digital document repository comprising a plurality of digital documents; and
a processor operably coupled to the memory, configured to:
identify a first digital document that is associated with an organization within the digital document repository;
identify a first graphical code, wherein the first graphical code is an encoded graphical representation of the first digital document;
send the first graphical code to an approved user device;
obtain a second graphical code, wherein the second graphical code is an encoded graphical representation of a public encryption key for the organization;
extract the public encryption key for the organization from the second graphical code;
obtain a third graphical code from the approved user device, wherein the third graphical code is an encoded graphical representation of a second digital document comprising data and a digital signature that was signed using a private encryption key for the organization;
extract the second digital document from the third graphical code;
validate the third graphical code using the public encryption key for the organization;

determine the third graphical code passes validation using the public encryption key for the organization; and store the second digital document in the digital document repository.

2. The device of claim 1, wherein:
the first graphical code is a first Quick Response (QR) code;
the second graphical code is a second QR code; and
the third graphical code is a third QR code.

3. The device of claim 1, wherein validating the third graphical code comprises:
performing a hashing operation on the data to generate a first hash;
decrypting the digital signature using the public encryption key to recover a second hash;
comparing the first hash and the second hash; and
determining the third graphical code is valid when then first hash matches the second hash.

4. The device of claim 1, wherein the processor is further configured to:
generate a copy of the second digital document; and
send the copy of the second digital document to a second device.

5. The device of claim 1, wherein extracting the second digital document from the third graphical code comprises converting the third graphical code into text.

6. The device of claim 1, wherein the data identifies one or more items that are associated with the organization.

7. The device of claim 1, wherein the second digital document is a modified version of the first digital document.

8. A digital document storing method, comprising:
identifying a first digital document that is associated with an organization within a digital document repository;
identifying a first graphical code, wherein the first graphical code is an encoded graphical representation of the first digital document;
sending the first graphical code to an approved user device;
obtaining a second graphical code, wherein the second graphical code is an encoded graphical representation of a public encryption key for the organization;
extracting the public encryption key for the organization from the second graphical code;
obtaining a third graphical code from the approved user device, wherein the third graphical code is an encoded graphical representation of a second digital document comprising data and a digital signature that was signed using a private encryption key for the organization;
extracting the second digital document from the third graphical code;
validating the third graphical code using the public encryption key for the organization;
determining the third graphical code passes validation using the public encryption key for the organization; and
storing the second digital document in the digital document repository.

9. The method of claim 8, wherein:
the first graphical code is a first Quick Response (QR) code;
the second graphical code is a second QR code; and
the third graphical code is a third QR code.

10. The method of claim 8, wherein validating the third graphical code comprises:
performing a hashing operation on the data to generate a first hash;
decrypting the digital signature using the public encryption key to recover a second hash;
comparing the first hash and the second hash; and
determining the third graphical code is valid when then first hash matches the second hash.

11. The method of claim 8, further comprising:
generating a copy of the second digital document; and
sending the copy of the second digital document to a second device.

12. The method of claim 8, wherein extracting the second digital document from the third graphical code comprises converting the third graphical code into text.

13. The method of claim 8, wherein the data identifies one or more items that are associated with the organization.

14. The method of claim 8, wherein the second digital document is a modified version of the first digital document.

15. A non-transitory computer-readable medium storing instructions that when executed by a processor cause the processor to:
identify a first digital document that is associated with an organization within a digital document repository;
identify a first graphical code, wherein the first graphical code is an encoded graphical representation of the first digital document;
send the first graphical code to an approved user device;
obtain a second graphical code, wherein the second graphical code is an encoded graphical representation of a public encryption key for the organization;
extract the public encryption key for the organization from the second graphical code;
obtain a third graphical code from the approved user device, wherein the third graphical code is an encoded graphical representation of a second digital document comprising data and a digital signature that was signed using a private encryption key for the organization;
extract the second digital document from the third graphical code;
validate the third graphical code using the public encryption key for the organization;
determine the third graphical code passes validation using the public encryption key for the organization; and
store the second digital document in the digital document repository.

16. The non-transitory computer-readable medium of claim 15, wherein:
the first graphical code is a first Quick Response (QR) code;
the second graphical code is a second QR code; and
the third graphical code is a third QR code.

17. The non-transitory computer-readable medium of claim 15, wherein validating the third graphical code comprises:
performing a hashing operation on the data to generate a first hash;
decrypting the digital signature using the public encryption key to recover a second hash;
comparing the first hash and the second hash; and
determining the third graphical code is valid when then first hash matches the second hash.

18. The non-transitory computer-readable medium of claim 15, wherein the instructions further cause the processor to:
generate a copy of the second digital document; and
send the copy of the second digital document to a second device.

19. The non-transitory computer-readable medium of claim 15, wherein extracting the second digital document from the third graphical code comprises converting the third graphical code into text.

20. The non-transitory computer-readable medium of claim 15, wherein the data identifies one or more items that are associated with the organization.

* * * * *